June 16, 1936.　　　　　　E. L. JONES　　　　　　2,044,077
PARAFFINING APPARATUS
Filed July 24, 1929　　　12 Sheets-Sheet 1
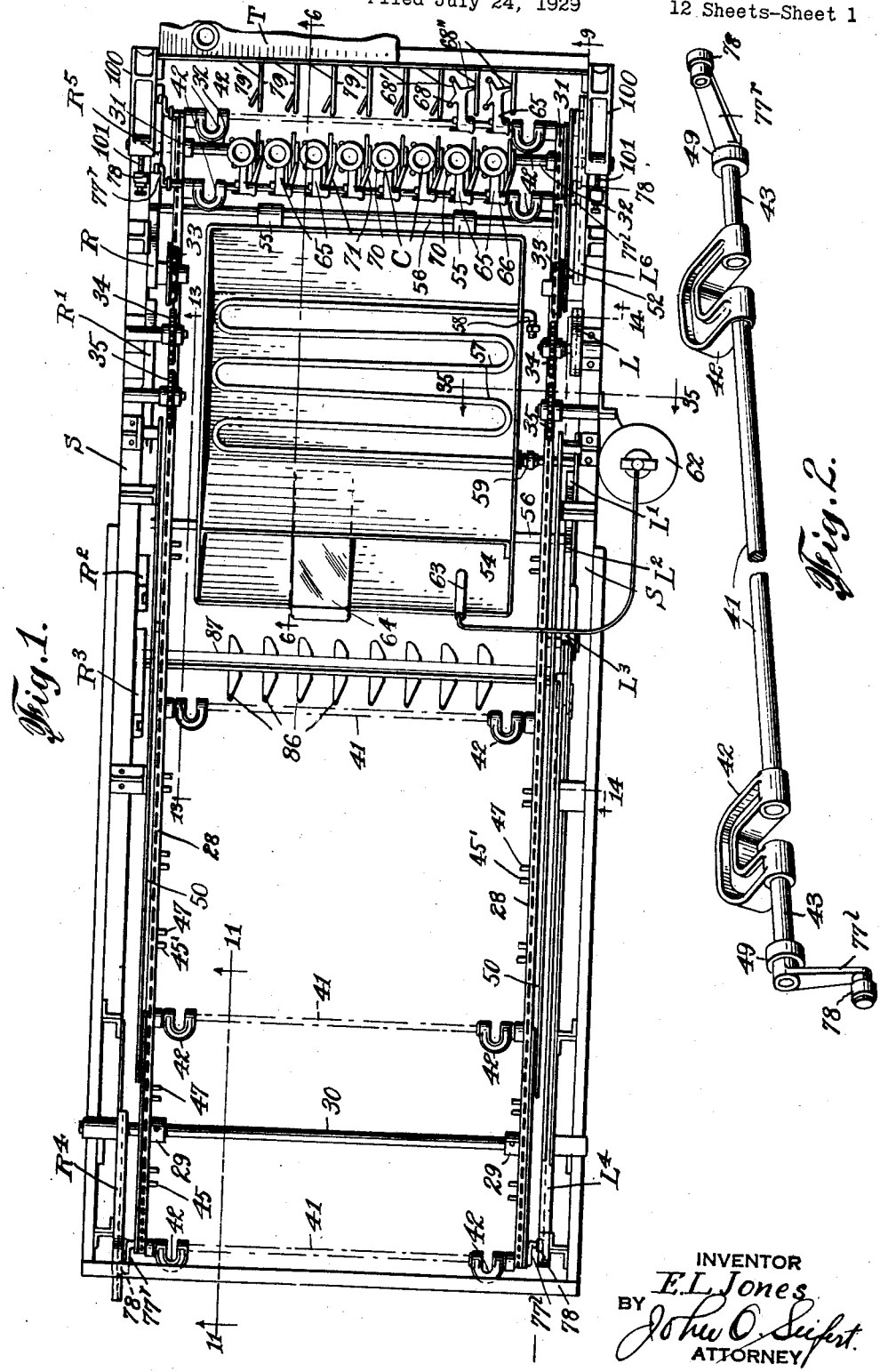
INVENTOR
E. L. Jones
BY John O. Seifert
ATTORNEY

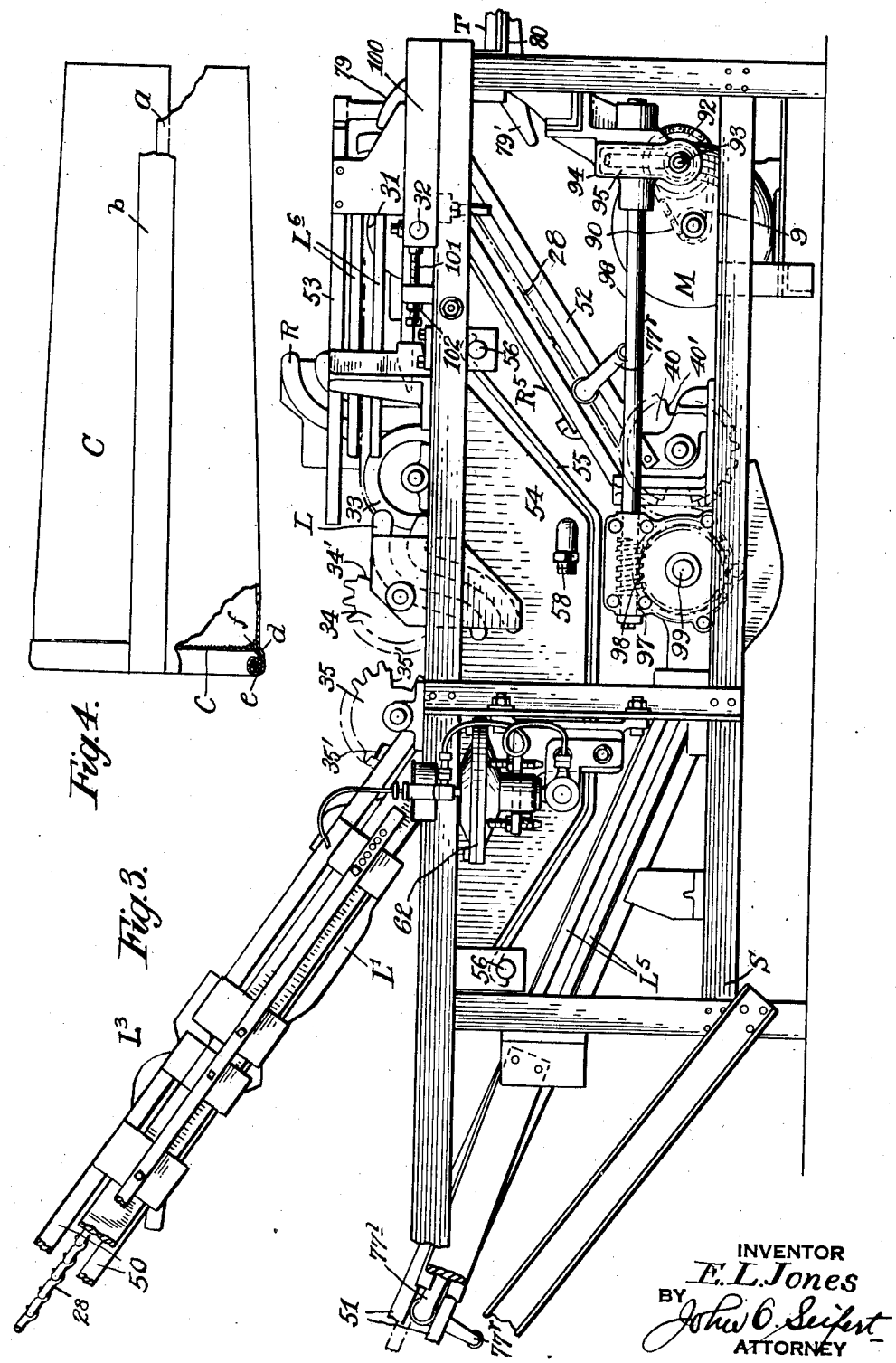

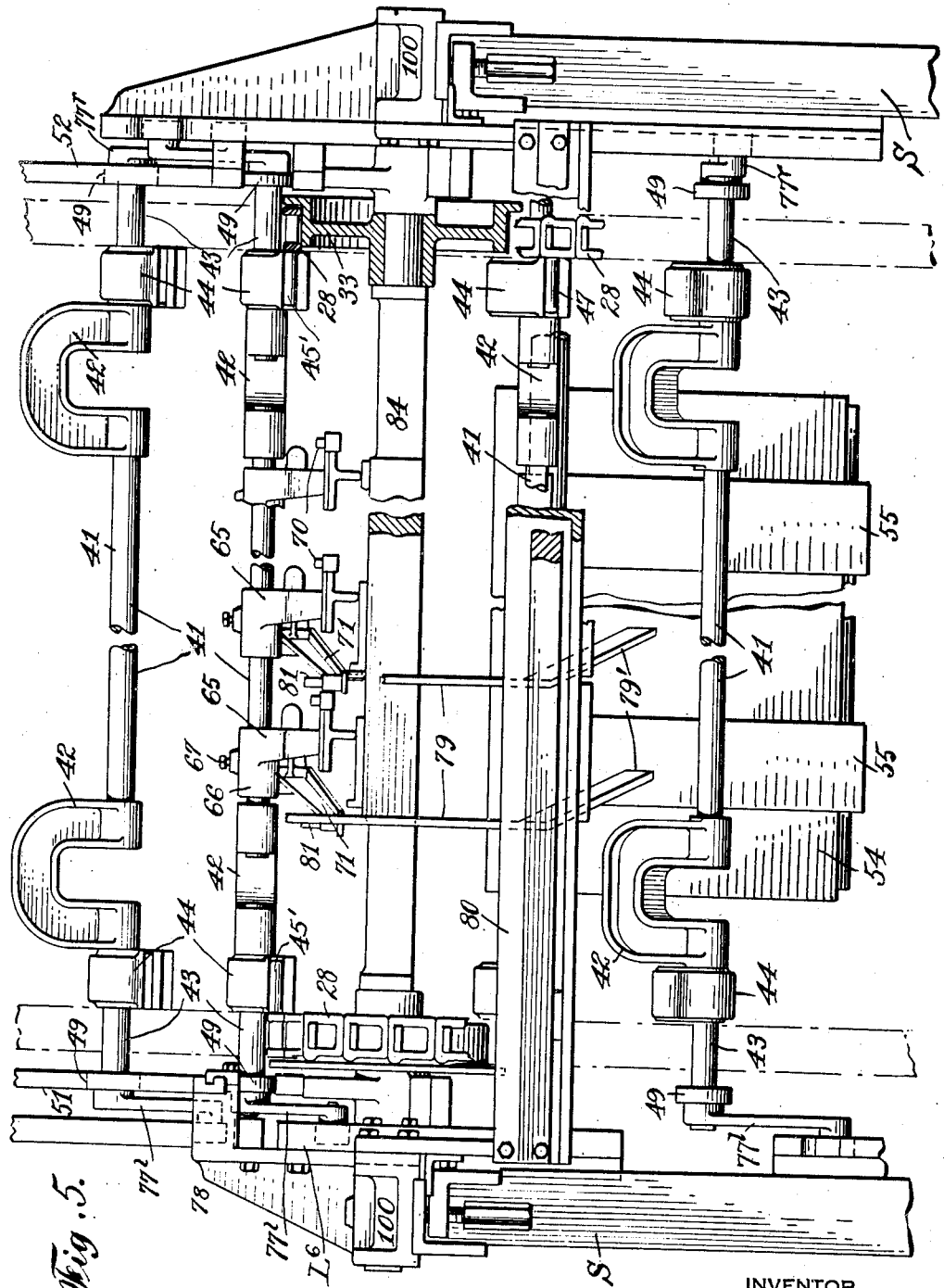

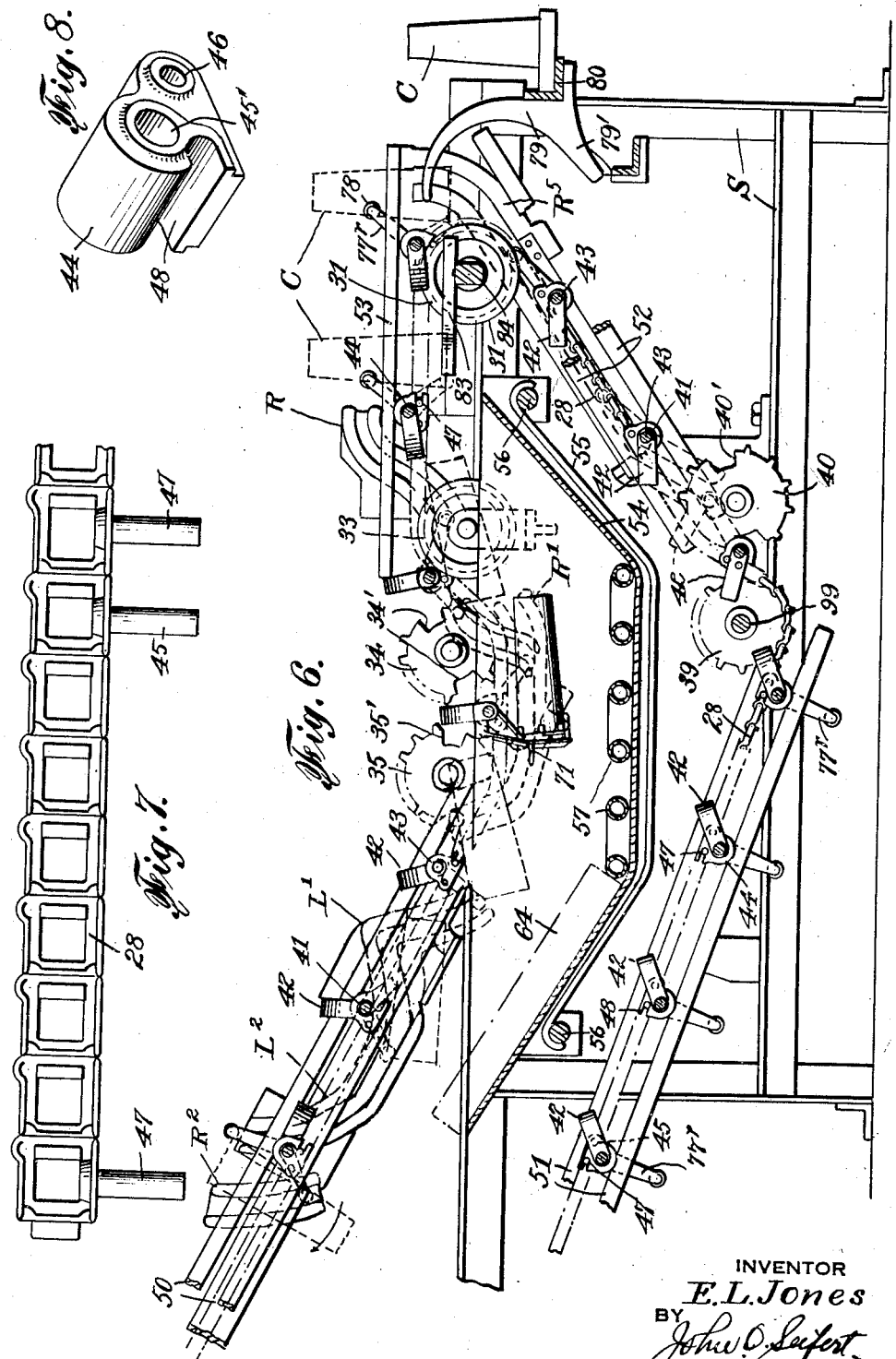

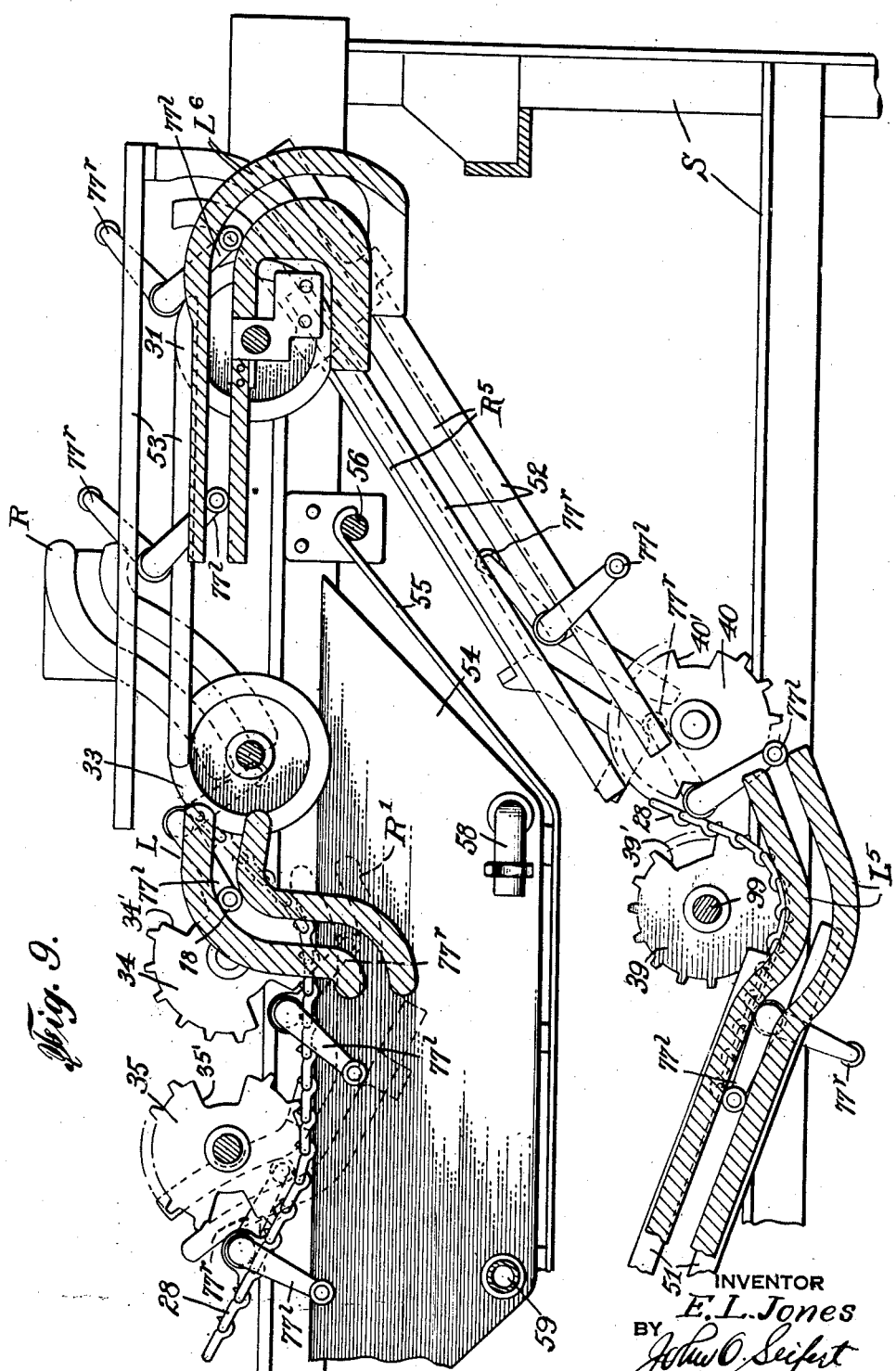

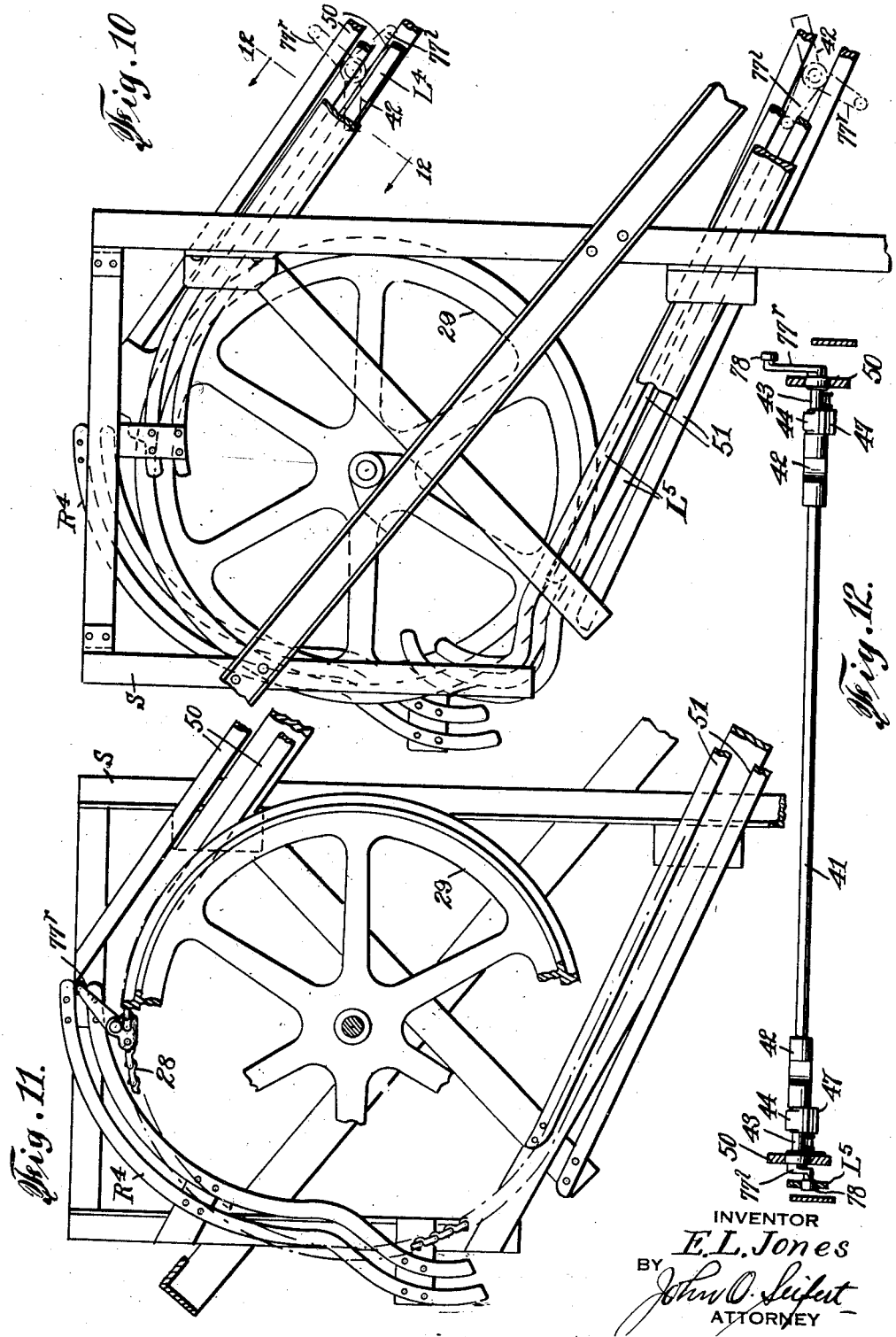

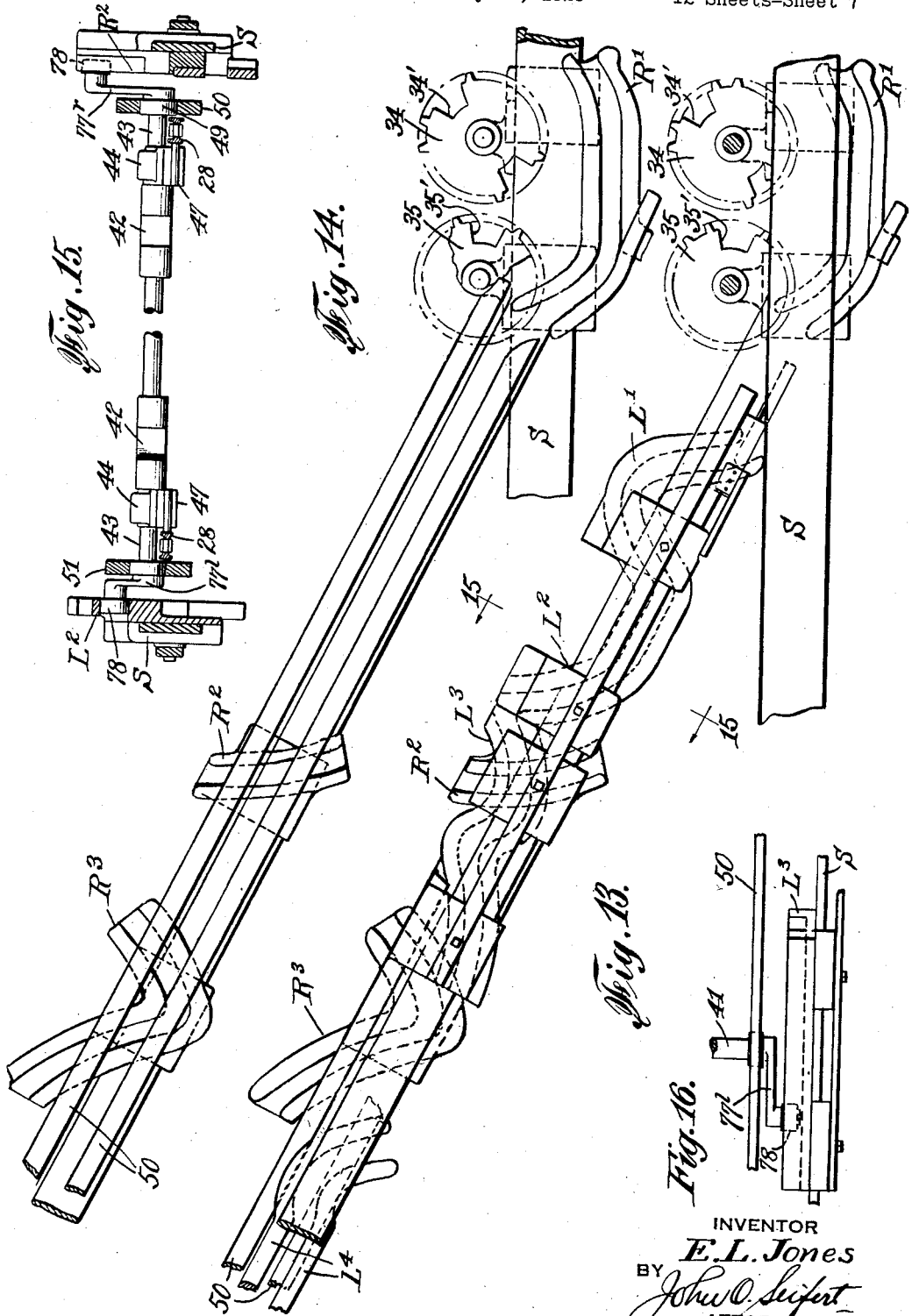

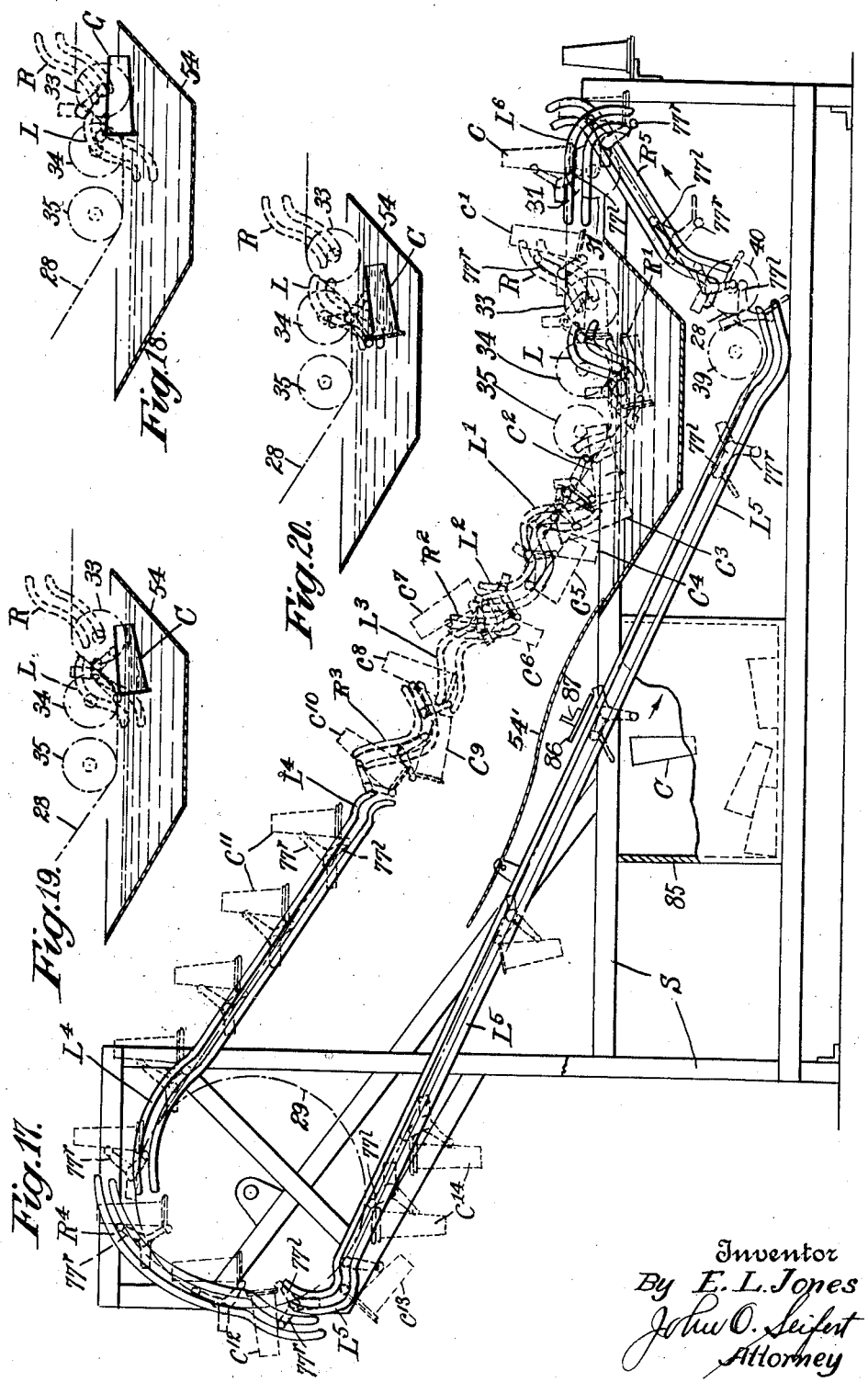

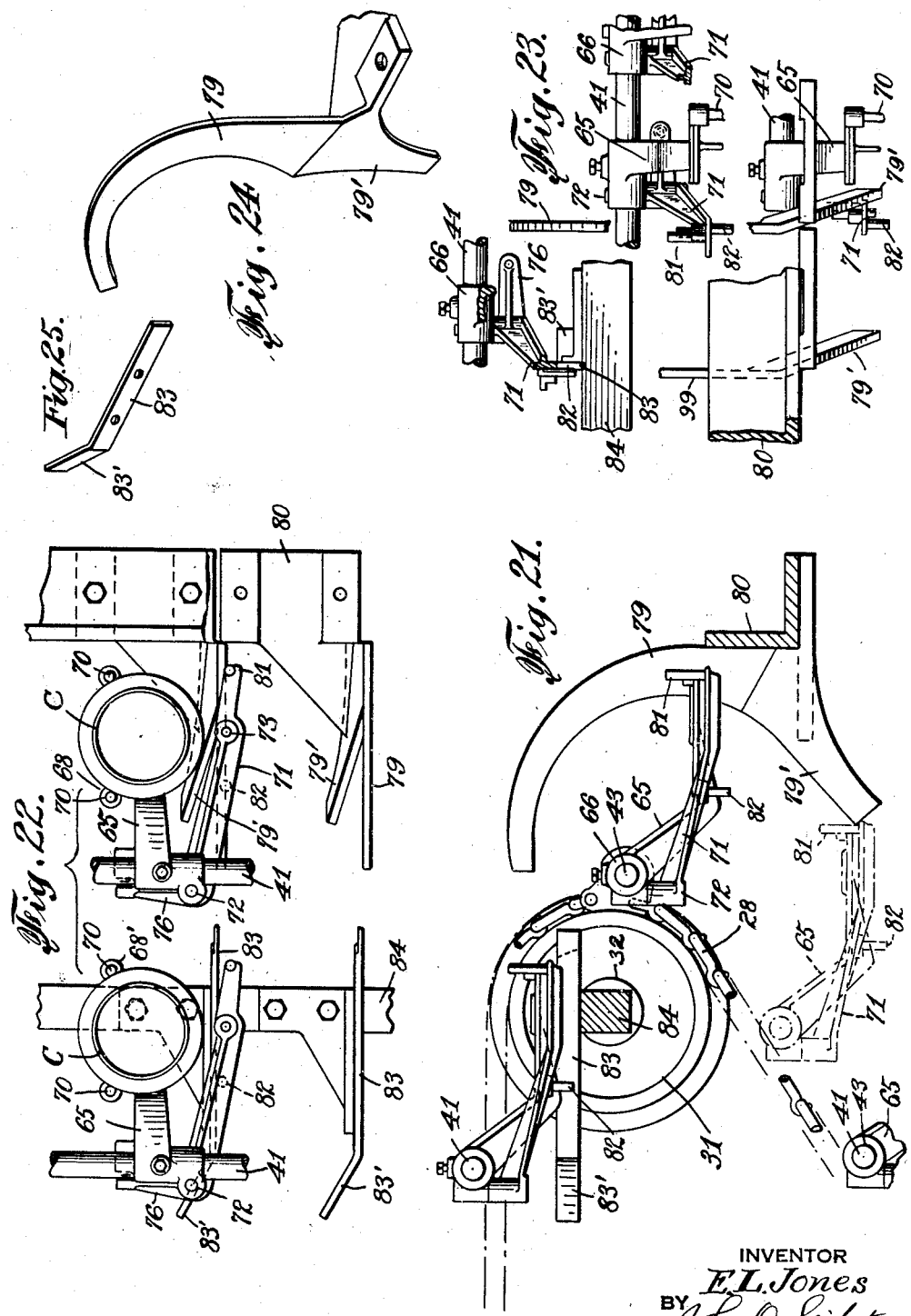

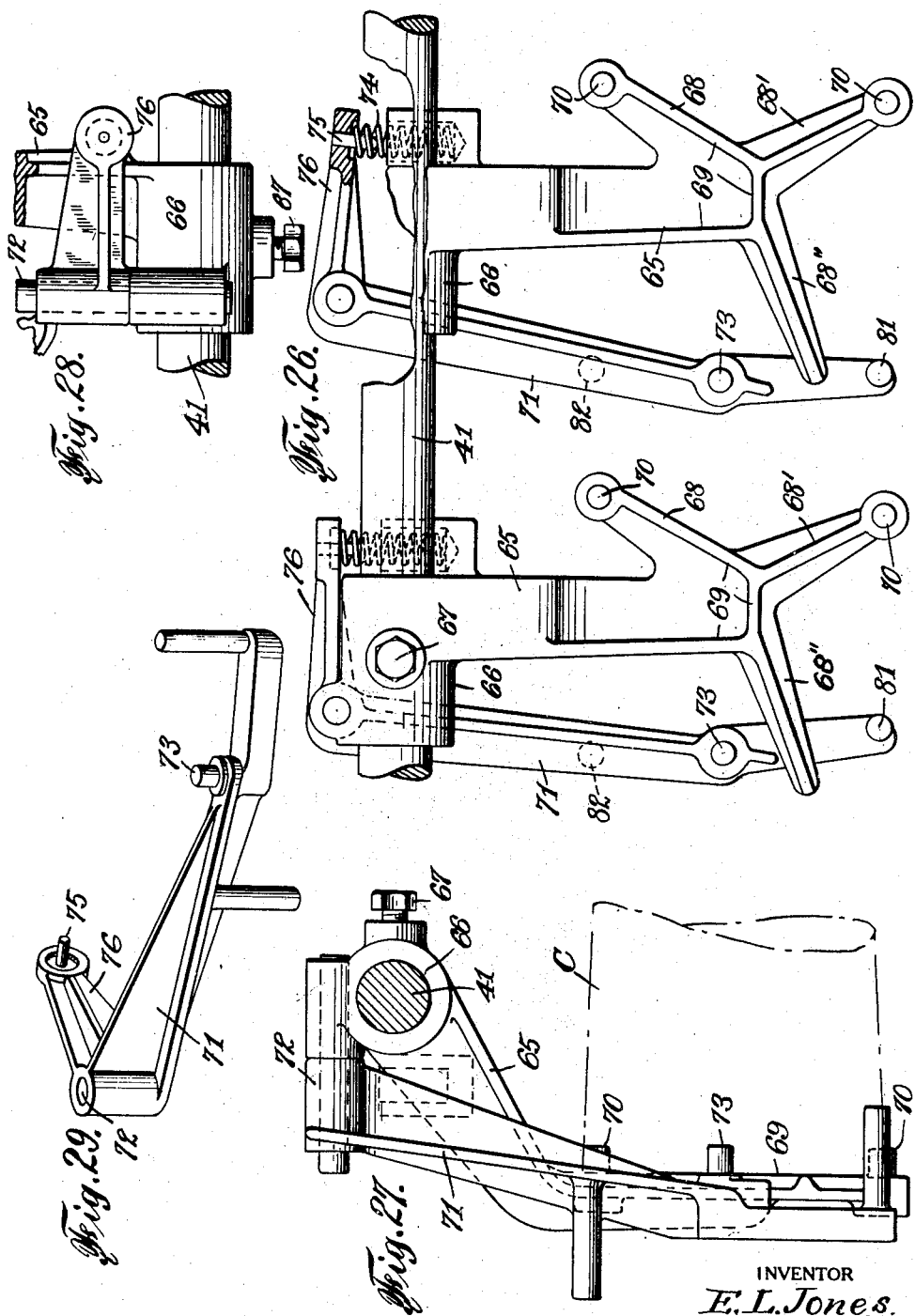

June 16, 1936. E. L. JONES 2,044,077
PARAFFINING APPARATUS
Filed July 24, 1929 12 Sheets-Sheet 11
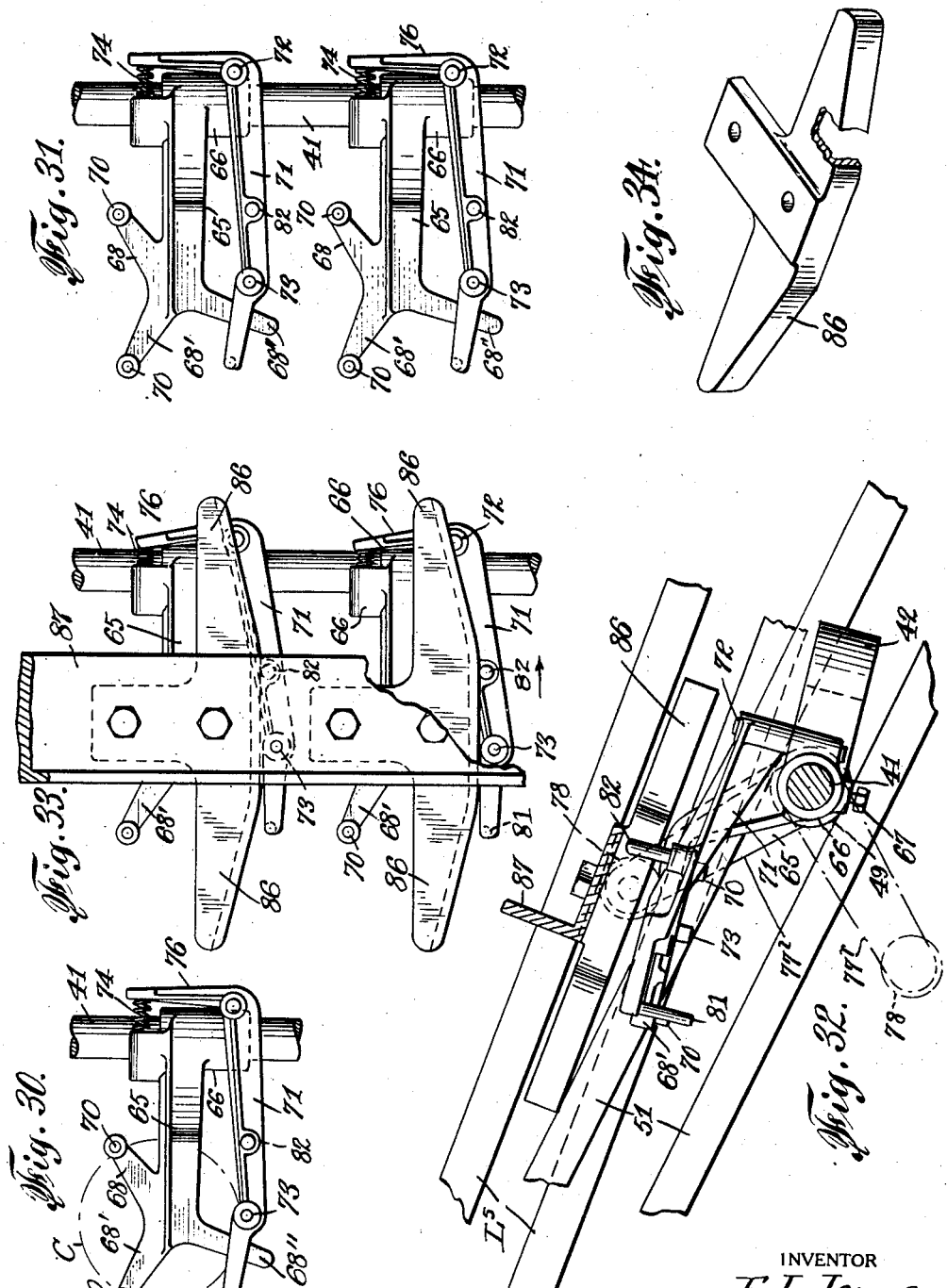

June 16, 1936.  E. L. JONES  2,044,077
PARAFFINING APPARATUS
Filed July 24, 1929   12 Sheets-Sheet 12
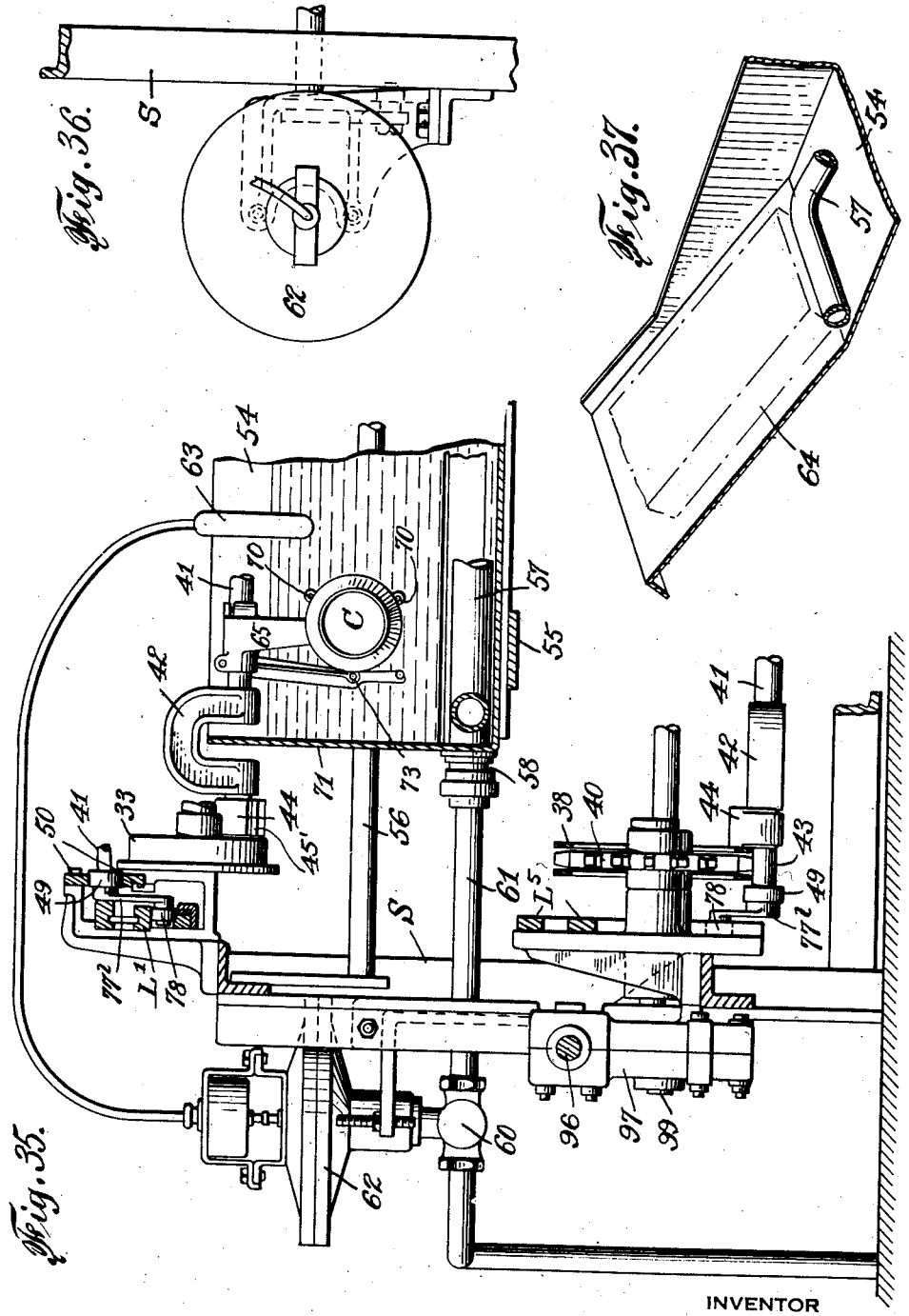
INVENTOR
E. L. Jones
BY John O. Seifert
ATTORNEY Patented June 16, 1936

2,044,077

UNITED STATES PATENT OFFICE 2,044,077

PARAFFINING APPARATUS

Ellis L. Jones, Long Island City, N. Y., assignor, by mesne assignments, to American Sealcone Corporation, New York, N. Y., a corporation of New York Application July 24, 1929, Serial No. 380,566

10 Claims. (Cl. 91—46)

This invention relates to the paraffining of receptacles made of paper, and particularly to the paraffining of receptacles as disclosed by Letters Patent #1,699,549, wherein the body is formed from a blank rolled to tubular form and secured adhesively at the longitudinal marginal portions forming a longitudinal side seam, and a closure disk to constitute the bottom secured in one end by crimping or interlocking the end portion of the receptacle body with the marginal portion of the disk.

It is an object of the invention to provide improved apparatus for and method of paraffining receptacles of this character to not only assure the impregnating of the material with the paraffine but also providing a paraffined coating of increased thickness or filet at the crevices formed by the side and bottom seams to prevent the seepage of the liquid contents of the receptacles to said seams and leakage of the receptacle.

In carrying out the invention there is provided a paraffined carrying trough arranged with means to fuse and maintain the paraffine at a predetermined consistency, the receptacle being immersed and passed through the paraffine bath. The receptacle is releasably supported by a holder mounted on an adjustable carrier forming part of an endless and continuously operating conveyor. The holder is arranged with means normally urged to receptacle gripping and holding position, means being provided at the forward end of the conveyor mechanism and paraffine trough to automatically adjust the receptacle gripping means to permit of the placing of a receptacle on the holder, further means being provided after the receptacle has been subjected to the paraffining treatment to actuate said receptacle gripping means to release the receptacle from the holder. Means are provided to guide the conveyor whereby a receptacle carried thereby is immersed in the paraffine bath, maintained in the paraffine bath for a predetermined length of travel of the conveyor, and then withdrawn from the paraffine bath and transported by the conveyor for a sufficient length of time for the paraffine to congeal or harden previous to the release of the receptacle from the holder. The receptacle is engaged in upright position on the holder with the side seam facing opposite to the direction of travel of the conveyor, and means are provided in parallel relation to the plane of travel of the conveyor to adjust the carrier for the receptacle holder so that the receptacle when it is immersed in the paraffine bath will be in a position with the mouth tilted upward slightly to the horizontal whereby there is a gradual flow of the paraffine into the receptacle and assuring the expelling of all of the air from the receptacle thus preventing the possibility of trapping air in the receptacle and a consequent forming of air bubbles on the interior surface of the receptacle and preventing the paraffine contacting with such portions of the wall surface with the result that the entire interior surface of the receptacle will not be impregnated with paraffine even though a film of paraffined coating is applied to said surface by the flow of the paraffine thereover. The receptacle is entered into and moved through the paraffine bath with the bottom foremost, the receptacle holder after the receptacle is completely immersed in the paraffine being adjusted to position the receptacle to extend in a substantially horizontal plane. As the receptacle is moved out of the paraffine bath the holder carrier is adjusted to again position the receptacle with the mouth slightly inclined upward to the horizontal and the side seam lowermost thereby draining the major portion of the paraffine from the receptacle and a flow of paraffine to and building up a paraffine filet at the side seam as well as permitting of the entrance of air into the receptacle. The receptacle is then moved to inverted position by a quick movement with the mouth of the receptacle engaged in the paraffine and thus pocketing in the receptacle the air entered therein. The holder carrier is then adjusted to position the receptacle slightly inclined to the vertical in which position it emerges from the paraffine, this inclining of the receptacle permitting of the entrance of air to the receptacle to displace the paraffine drained therefrom the entrance of such air cooperating with the air pocketed in the receptacle to prevent the creation of a vacuum in the receptacle as the paraffine is drained therefrom and a consequent sucking of the paraffine, which is in the nature of a mobile body, from a part or parts of the wall of the receptacle with the result that there will be an insufficient quantity of the paraffine on such part or parts of the receptacle wall to render the same impervious to the liquid contents of the receptacle. The holder carrier as the receptacle is withdrawn from the paraffine bath is adjusted to position with the mouth lowermost and inclining slightly to the vertical in a direction opposite to that in which it was withdrawn from the paraffine bath and then moved in successive sequence to position with the mouth inclining slightly downward from the horizontal and the side seam lowermost effecting a flow of the paraffine to the side seam, across the bottom and longitudinally outward along the side seam, and then to vertical position with the mouth lowermost and from which position it is moved by a relatively quick movement in a circular orbit in the plane of the axis of the receptacle to effect a flow of the paraffine inwardly toward and across the bottom in the opposite direction. The holder carrier is then adjusted to move the receptacle to upright vertical position effecting a draining of the paraffine from the side wall to the bottom seam and in which position it is maintained during the congealing or hardening of the paraffine. The foregoing adjustment of the holder carrier is effected during the travel thereof along the upper stretch of the conveyor, and as the carrier passes to the lower stretch it is adjusted to position the holder with the receptacle in inverted position and in which position and during the travel thereof along the lower stretch of the conveyor the receptacle holder is actuated to release the receptacle therefrom. The conveyor mechanism embodies a pair of laterally spaced chains and carriers in the form of bars extended between and pivotally mounted upon the chains, receptacle holders being mounted on said bars in predetermined spaced relation, and the carrier bars being arranged for the engagement of means to guide and support the same and having arms fixed thereon to engage with and be moved relative to cam members arranged alongside the conveyor guide and support and whereby the carrier bars are adjusted to variably position the receptacle as set forth carried by the holders mounted on the carrier bars.

In the drawings accompanying and forming a part of this application Figure 1 is a plan view of apparatus for carrying out the method with a forward portion broken away and only part of the carriers for the receptacle holders of the conveyor shown.

Figure 2 is a perspective view of a carrier for the receptacle holders and showing the means connected thereto for guiding the conveyor and supporting said carriers and for adjusting the carriers to variably position the receptacles during the travel of the conveyor.

Figure 3 is a side elevation of the forward part of the apparatus and looking at the bottom of Figure 1.

Figure 4 is an elevational view, partly broken away and partly in section, of a receptacle to the paraffining of which the present apparatus and method is particularly adapted.

Figure 5 is an end elevation looking at the right of Figure 1, partly broken away to show the arrangement of different parts.

Figure 6 is a sectional view of the right hand end of the machine as viewed in and taken substantially on the line 6—6 of Figure 1 looking in the direction of the arrows.

Figure 7 is a plan view of a chain forming a part of the conveyor and showing the means for mounting the carriers for the receptacle holders thereon.

Figure 8 is a perspective view of a member for mounting the carriers for the receptacle holders on the conveyor chains.

Figure 9 is a longitudinal sectional view taken substantially on the line 9—9 of Figure 1 looking in the direction of the arrows.

Figure 10 is a side elevation of the rear portion of the apparatus looking at the bottom of Figure 1.

Figure 11 is a sectional view of the rear portion of the apparatus taken substantially on the line 11—11 of Figure 1 looking in the direction of the arrows.

Figure 12 is a cross sectional view taken substantially on the line 12—12 of Figure 10.

Figure 13 is a side elevation taken substantially on the line 13—13 of Figure 1 looking in the direction of the arrows to show the arrangement of cams in the plane of travel of the conveyor to adjust the carriers for the receptacle holders and variably position the receptacles during the travel of the conveyor.

Figure 14 is a sectional view taken substantially on the line 14—14 of Figure 1, looking in the direction of the arrows, to show the arrangement of carrier adjustment cams at the right hand side of the apparatus.

Figure 15 is a cross sectional view taken substantially on the line 15—15 of Figure 13.

Figure 16 is a plan view to illustrate the relation of one end of a carrier for the receptacle holders in relation to the conveyor guiding means and the means to adjust the carrier.

Figure 17 is a side elevation and showing in a diagrammatic manner successive positions the receptacle assumes by the adjustment of the carrier for the receptacle holder during the travel of the conveyor.

Figures 18, 19, and 20 are side elevations showing in a diagrammatic manner the successive positions the receptacle assumes as it is immersed in the paraffine in the trough.

Figure 21 is a sectional side elevation of the forward part of the apparatus to show the positions the receptacle holders assume as the conveyor passes from the lower to the upper stretch thereof, and the arrangement of cams in relation thereto to adjust the holders to permit engaging a receptacle thereon.

Figure 22 is a plan view looking at the top of Figure 21 and showing the holders in relation to actuating cams therefor and a receptacle engaged upon the holders.

Figure 23 is a view looking at the right of Figure 21 with parts broken away.

Figures 24 and 25 are perspective views of the actuating cams for adjusting the holders to permit engaging the receptacles on the holders.

Figure 26 is a plan view to show the mounting of the receptacle holders on the carriers therefor of the conveyor mechanism.

Figure 27 is a side elevation looking at the left of Figure 26 and showing in dot and dash lines a receptacle engaged on a holder.

Figure 28 is an end elevation of the holder partly broken away to show the mounting thereof on its carrier.

Figure 29 is a perspective view of the movable or gripping member of a holder.

Figures 30 and 31 are bottom views of the holder to show the mounting and arrangement thereof on the carriers therefor of the conveyor.

Figure 32 is a side elevation showing a holder on a carrier in relation to a cam for actuating the holder to release a receptacle therefrom during the travel of the conveyor.

Figure 33 is a plan view looking at the top of Figure 32.

Figure 34 is a perspective view of a cam for actuating the movable member of a holder to release a receptacle therefrom.

Figure 35 is a cross sectional view taken substantially on the line 35—35 of Figure 1 looking in the direction of the arrows to show a regulator for the heating means for the paraffine in the trough thermostatically controlled by the heat of the paraffine.

Figure 36 is a plan view of the heat regulating means to show the mounting thereof; and Figure 37 is a perspective view of a shelf forming a part of the paraffine trough for the engagement of a cake of paraffine preparatory to the fusing thereof in the trough.

In the embodiment of the apparatus illustrated for carrying out the method the operative parts are mounted upon a supporting structure, (designated in a general way at S), comprising parallelly arranged sides connected by cross members.

The receptacles C are transported by a travelling conveyor mechanism comprising a pair of endless chains 28, 28 supported to travel in juxtaposed relation to the sides of the supporting structure, said chains passing around sprocket wheels 29 fixed to a shaft 30 rotatably mounted on an elevated portion at the rear end of the supporting structure and around sprocket wheels 31 fixed to a shaft 32 rotatably mounted on the opposite or forward end of the supporting structure and in a lower plane than the sprocket wheel carrying shaft 30. The upper stretch of the conveyor chains in their travel from the sprocket wheels 31 are guided over peripherally flanged wheels 33 to below a pair of sprocket wheels 34, 35, and the lower stretches in their travel from the sprocket wheels 29 to the sprocket wheels 31 pass below and over sprocket wheels 39, 40, (Figures 6, 9, and 17), the sprocket wheels 34, 35 and 39, 40 being fixed to stub shafts whereby they are rotatably mounted upon the sides of the supporting structure.

Carriers for receptacle holders are connected to the chains, said carriers comprising bars or shafts 41 (Figure 2) fixed at the opposite ends in one leg of yoke members 42 with stub shafts 43 fixed in the other leg of the yoke members to extend co-axially of the bar 41. These carriers are rotatably mounted on the chains in predetermined spaced relation by mounting brackets 44 (Figure 8) having a bore 45' for the loose engagement of the stub shafts 43 of the carriers, the carrier supporting brackets being mounted on the chains by pins 45 (Figure 7) fixed in an extending laterally from a chain link and loosely engaged in a bore 46 in the brackets 44, the brackets being held against rotation on the chain pins 45 by pins 47 fixed in and extending laterally from links of the chains successive to the links in which the pins 45 are mounted and engage a recess 48 in the carrier mounting brackets 44. The upper stretch of the conveyor chains in their travel from the sprocket wheels 35 to the sprocket wheels 29 are supported and guided by rollers 49 on the holder carriers engaging between parallelly arranged guide rails 50 (Figures 3, 6, 10, 13, and 14). The lower stretch of the chains are supported and guided in their travel from the sprocket wheels 29 to the sprocket wheels 39 between rails 51, and from the sprocket wheels 40 to the sprocket wheels 31 between rails 52, the chains being supported and guided in their travel from said latter wheels 31 to the wheels 33 between rails 53. By this arrangement the upper stretches of the conveyor chains are caused to enter and travel for a predetermined length of conveyor travel through a trough or pan 54 suspended by carriers 55 from transverse bars 56 mounted upon the supporting structure to extend between the conveyor chains and in a plane below the upper stretch thereof.

The trough 54 is adapted for the carrying of paraffine, which is fused therein and maintained in a melted condition by suitable means, in the present instance comprising a steam coil 57 having an inlet 58 and outlet 59 for connection in circulation with a source of steam supply, and controlled by a valve, shown in a conventional manner at 60, interposed in a pipe 61 connected with the coil inlet 58. To maintain the paraffine in the trough at a predetermined consistency means are provided to automatically control the valve 60 and thereby regulate the heat supply, comprising thermostatically actuated valve operating means, illustrated in a conventional manner at 62, which is controlled and regulated by the temperature of the paraffine by means of a temperature responsive element 63 engaged in the paraffine in the trough and having connection with the thermostatically actuated valve operating means 62 (Figures 35, 36). To provide a constant supply of the parffine to the trough the rear end of the trough is arranged with a shelf inclined rearwardly and upwardly upon which a cake or cakes of the paraffine are placed partially engaged in the fused paraffine in the trough, as shown in dot and dash lines 64 in Figure 37.

Holders (Figures 26 to 29, inclusive,) for releasably supporting receptacles C, an embodiment of which receptacle is shown in Figure 4, are mounted upon the carrier bars 41 in equi-distant spaced relation, there being eight of the holders mounted upon each of the carrier bars in the present instance. The receptacle holders comprise members or arms 65 having a sleeve portion 66 at one end whereby they are engaged upon the carrier bars to extend laterally therefrom and secured thereon by set screws 67, fingers 68, 68', 68'' projecting laterally from the arms 65 in the form of a spider, and ribs 69 extending up from one face of said arm and fingers for engagement of marginal portions of the bottom of a receptacle placed thereon. The receptacles are positioned upon the arms by pins 70 fixed in and extending upward from the fingers 68, 68' engaging marginal portions about the bottom end of the receptacle and are releasably retained thereon by gripping means yieldingly engaged with a marginal portion at the bottom end of the receptacle opposed to and intermediate the pins 70, this gripping means comprising an arm in the form of a lever 71 pivotally supported, as at 72, upon the sleeve portion 66 of arms 65 to have movement in a direction transversely of and urged in a direction toward the arms 65 by engaging a pin 73 fixed in and extending from said arm intermediate the ends thereof with the receptacle positioned on the arm 65 relative to the pins 70 and clamping the receptacle between the pins 70, 73 by a spring 74 seated at one end in a recess in a lug extended laterally from the arm sleeve 66 with a pin 75 fixed in and extending from angular arm 76 of the lever 71 engaging in the opposite end of the spring.

To adjust the carrier bars 41 with the receptacle holders thereon during the travel of the conveyor to variably position the receptacles carried by the holders' arms, which are in the nature of crank arms, are fixed to the ends of the stub shafts 43, the arms at the right hand end of the carriers being indicated by 77r and the arms at the left hand end thereof by 77l, said arms carrying laterally extended pins at the ends with rollers mounted thereon, as at 78, for engagement of guiding cam members mounted on the right hand and left hand sides of the supporting structure in the plane of travel of the conveyor chains.

The receptacles are placed upon the holders at the front end of the machine, the right hand end as viewed in Figure 1, the receptacles being placed by an attendant on a table T at said end of the apparatus and from which table they are picked up by the operator and placed upon the receptacle supports 65 as the conveyor chains are advanced around the sprocket wheels 31. To permit positioning the receptacles on the arms or plates 65 of the holders it is necessary that the lever arms 71 be positioned laterally of said supporting arms 65. To adjust the lever arms 71 laterally during the travel of the conveyor and retain them in such position to permit engaging receptacles on the arms 65 gauged relative to the pins 70, cams, in the form of plates 79, are mounted on a transverse member 80 fixed to the sides of the supporting structure to extend in a plane below the sprocket wheel carrying shaft 32, these cams being equal in number to the holders on a carrier and spaced apart distances corresponding to the spacing of the holders on the carriers. These cams have an angular portion 79' extending downward from the support 80 to intersect the path of travel of and for engagement by pins 81 extended upward from the holder arms 71, (Figures 21 to 25,) and as said pins ride up said inclined cam portions they are moved laterally of the holder arms 65, as shown at the right in Figure 26, against the tension of the springs 74. The upper portion of the cam plates 79 are of arcuate shape and extend laterally of the support 80 in the direction of travel of the conveyor, and as the pins ride upon the inclined portions 79' and onto said arcuate portions the latter are engaged by the sides of the holder arms 71 and positioned as shown in Figure 26, and as said holder arms ride off from said arcuate cam portions pins 82 extended downward from the holder arms 71 engage a portion of cam plates 83 (Figure 25) extending in the plane of the arcuate portions of cam plates 79, said cam plates being mounted upon a transverse member 84 of the supporting structure. The operator places the receptacles on the holders during that portion of the travel of the conveyor when the holder arms ride along the arcuate portion of cam plates 79 and plates 83. The ends 83' of the cam plates 83 extend in the direction of travel of the conveyor and are inclined laterally, as shown in Figure 22, and as the pins 82 ride along said inclined portion they are moved through the action of the springs 74 toward the holder arms 65 to engage the holder pins 73 with receptacles on the holder arms 65 and clamp the receptacles between said pins 73 and the pins 70, the receptacles C being in the position shown in dotted lines in Figure 6. With the receptacles in this position the conveyor chains are guided between rails 53 to the guide rollers 33 and from said latter rollers to sprocket wheels 34, 35, said wheels having diametrically opposite cut away portions 34', 35' to clear the holder carriers. As the holder carriers approach the guide wheels 33 the roller carried by arm 77$^r$ engages between cam rails R effecting a rotation of the holder carriers and thereby move the receptacles C in an orbit in the plane of the axis of the receptacles and in a direction forward of the machine or opposite to the direction of travel of the conveyor, as shown at C' in Figure 17. As the roller on carrier arm 77$^r$ rides from between the cam rails R the receptacles assume a substantially horizontal position and the receptacles are entered into the paraffine in the trough 54 when the roller carrying arm 77$^1$ engages between cam rails L, as shown in Figure 18. As the roller on arm 77$^1$ rides between cam rails L the receptacles will be positioned with the mouth or open end inclined slightly upward from the horizontal, as shown in Figure 19, and maintained in such position until they are immersed in the paraffine bath, as shown in Figure 20. It will be noted that the receptacles are entered into the paraffine bath with the receptacle bottom forward or in the direction of travel of the conveyor, and by the immersing of the receptacles with the mouth inclined slightly upward to the horizontal there will be a gradual flow of the paraffine into the receptacles and the expelling of all of the air from the receptacles prevents the creation and the adhering of air bubbles to the inner surface of the receptacles and assuring contact of the paraffine with the entire inner surface of the receptacles.

During the travel of the roller on carrier arm 77$^1$ from between cam rails L, the roller on carrier arm 77$^r$ engages between cam rails R$^1$ thereby maintaining the receptacles in a substantially horizontal position during a predetermined length of conveyor travel with the receptacles immersed in the paraffine bath, the greater portion of the cam rails R$^1$ (Figures 13, 14, and 17) being in a substantially horizontal plane with the rear ends curved upwardly, said ends being arranged adjacent the sprocket wheels 35 and as the conveyor chains pass around said sprocket wheels the receptacles are being withdrawn from the paraffine bath, and by the curvature of the ends of the cam rails R$^1$ the carriers are adjusted to position the receptacles with the mouth inclined slightly upward to the horizontal and the side seam of the receptacle lowermost, in which position they are withdrawn from the bath, as shown at C$^2$ in Figure 17, permitting the major portion of the paraffine to drain from the receptacles, the paraffine draining toward and along the side seam, and entrance of air thereto. During the continued travel of the conveyor the roller on carrier arm 77$^r$ passes from between cam rails R$^1$ and the roller on carrier arm 77$^1$ engages between cam rails L$^1$ imparting a quick rotative movement to the holder carriers and moving the receptacles in the direction indicated by the arrow to inverted position C$^3$ with the mouth of the receptacles inclined downwardly to drain the paraffine toward the side seam and the mouth engaged or immersed in the paraffine and thereby pocketing the air entered into the receptacle in the receptacles in the C$^2$ position with the side seam. During the continued movement of the carrier relative to the cam rails L$^1$ said rails are arranged to maintain the receptacles in inverted position but slightly inclined to the vertical, as shown at C$^4$, permitting the draining of the paraffine from the receptacles and simultaneously the entrance of air into the receptacles which cooperates with the air pocketed in the receptacles to prevent the creation of a vacuum in the receptacles and the sucking of the paraffine away from a part or parts of the inner wall of the receptacles, which experience has shown is possible since the paraffine is in the nature of a mobile body, with the result that a part of parts of the inner wall of the receptacles will have an insufficient coating of the paraffine to prevent the material of the receptacles from absorbing the liquid contents of the receptacles and possible rupture of the receptacles.

The receptacles, as shown in Figure 4, are constructed from a blank rolled to tubular form with the longitudinal marginal portions in overlapped relation, as at $a$, and secured by a strip $b$ adhesively applied over said lapped portions, the one end of the receptacle body being closed by a flanged disk $c$ engaged in one end thereof and seated against a shoulder $d$, the closure disk being secured in the receptacle body by interfolding inwardly the contiguous marginal portions of the receptacle and disk flange into interlocking relation, as at $e$. The receptacles when they are placed on the receptacle holders are positioned with the sealing strip $b$ rearwardly of the direction of travel of the conveyor or opposite the operator. As the conveyor continues to travel relative to the cam rails $L^1$ the holder carriers are adjusted to position the receptacles as shown at $C^5$, in which position the sealing strip $b$ of the receptacles are lowermost and effecting a flow of the paraffine from one side to the side seam and longitudinally outward from the receptacle and a simultaneous flow across the bottom, thus assuring the flow of the paraffine between the lap of the marginal portions $a$ of the side seam and interposed between the joint forming adhesive of the side securing strip and the interior of the body and a coating or fillet of increased thickness at the side seam of the body as well as at the interstices in the joint between the body and receptacle closure which is lowermost in such position of the receptacles, as shown in a diagrammatic manner by stippling at $f$ in Figure 4. The cam rails $L^1$ have an upwardly curved portion $L^2$ at the ends and as the roller carrier arm $77^r$ moves relative to said portion of said cam rails the holder carriers are adjusted to position the receptacles as shown at $C^6$, and substantially in vertical position with the mouth lowermost, as the roller on carrier arm $77^1$ rides from between the cam rail portions $L^2$ the roller of carrier arm $77^r$ engages between cam rails $R^2$ imparting a quick movement to the holder carriers and the receptacles in an orbit in the plane of the axis of the receptacles to position the receptacles upright and slightly beyond the vertical, as at $C^7$, effecting a flow of the paraffine from the opposite side and into the receptacles as well as across the bottom. As roller on carrier arm $77^r$ moves from between the cam rails $R^2$ the roller on carrier arm $77^1$ engages between cam rails $L^3$ adjusting the holder carriers to position the receptacles in substantially upright vertical position when the roller on carrier arm $77^1$ passes from between cam rails $L^3$ and roller on carrier $77^r$ engages between cam rails $R^3$ adjusting the holder carrier to position the receptacles to extend substantially in a horizontal plane with the side seam lowermost as shown at $C^9$ and $C^{10}$ with the receptacles inclining slightly to the vertical to effect a flow of the paraffine to the juncture of the side seam with the bottom seam. As the roller on carrier arm $77^r$ passes from between cam rails $R^3$ the roller on carrier arm $77^1$ passes between cam rails $L^4$ moving the receptacles to an upright position $C^{11}$ and effecting a draining of the paraffine to the bottom of the receptacles. The receptacles are maintained in this latter position until the conveyor chains pass around the sprocket wheels 29 when the roller on carrier arm $77^1$ passes from between the cam rails $L^4$ and roller on carrier arm $77^r$ engages between cam rails $R^4$ and still maintain the receptacles in the $C^{11}$ position. As the conveyor chains pass around the sprocket wheels 29 and at the commencement of the lower stretch of the chains the roller on carrier arm $77^r$ passes from between cam rails $R^4$ and roller on carrier arm $77^1$ engages between cam rails $L^5$ moving the receptacles successively to the positions $C^{12}$, $C^{13}$ and $C^{14}$, the receptacles being inverted in the latter position and in which position the movable members 71 of the holders are actuated to release the receptacles and permit them to drop into a receiving receptacle 85 positioned below the lower conveyor stretch, or they may be dropped on to a chute for delivery to receptacle filling apparatus. A drain or catch board 54' for paraffine dripping from the receptacles is positioned relative to the cam rails $L^2$ to $L^4$ and $R^2$ to $R^3$.

To actuate the movable or gripping member 71 of the receptacle holders to release the receptacles from the holders a series of cams 86 are fixed upon a bar 87 (Figures 30 to 34) extending transversely of the supporting structure above the lower stretch of the conveyor chains, as shown in Figure 17. The receptacle holders during the travel along the lower conveyor stretch are in inverted position. The cam members 86 are in the form of plates having inclined edges at the opposite ends with an intermediate high portion and as the holders approach said cams the pins 82 extended from the movable holder members 71 engage with and ride up the high portions of said cam members moving said holder members laterally of the fixed holder members 65 against the tension of the springs 74.

As the conveyor chains pass around the sprocket wheels 39 the roller on carrier arm $77^1$ passes from between the cam rails $L^5$ and the roller on carrier arm $77^r$ engages between cam rails $R^5$ adjusting the holder carriers to position the holders with the receptacle engaging portion uppermost, the conveyor chains during this portion of the travel thereof being guided and supported by the guide rollers 49 on the holder carriers engaging between the guide rails 52 (Figure 3). As the conveyor chains pass around sprocket wheels 31 the roller on carrier arm $77^r$ passes from between cam rails $R^5$ and roller on carrier arm $77^1$ engages between cam rails $L^6$, said cam rails having a curved portion and a portion extending horizontally and parallelly to the supporting and guiding rails 53 and maintaining the holders during this portion of the travel of the conveyor with the receptacle engaging portions uppermost in a substantially horizontal plane with the movable holder members 71 moved and maintained laterally of the fixed holder members 65 by the engagement of said holder members 71 with the cam plates 79, 83 as hereinbefore described.

The apparatus is driven from an electric motor, shown in a conventional manner at M, (Figure 3,) by a sprocket chain 90 passing around a sprocket wheel 91 on the motor shaft and a sprocket wheel 92 fixed on a shaft 93 journaled in a bracket 94 fixed to the supporting structure, the shaft 93 having a worm and worm wheel driving connection 95 with a shaft 96 journaled at one end in the bracket 94 and journaled at the opposite end in a bracket 97 also mounted upon the supporting structure and having a worm and worm wheel driving connection 98 with shaft 99 on which the sprocket wheel 39 is fixed. The sprocket wheels 39 and 40 have diametrically opposite cut out portions 39', 40' similar to the sprocket wheels 34, 35 for the passage of the holder carrier bars 41.

To take up slack in the chains of the conveyor the shaft 32 on which the sprocket wheels 31 are mounted is journaled in a frame 100 slidably mounted on the supporting structure, (Figure 3,) said frame being adjusted by adjustable abutments in the form of lead screws 101 threaded into lugs on the supporting structure and secured in adjusted position by lock nuts 102 on the lead screws. The frame 100 also carries the carrier bar supporting guide rails 53 as well as the cam rails $L^6$ and $R^5$.

While I have illustrated one embodiment of means for carrying out the invention it will be obvious that various modifications may be made in construction and arrangement of parts, and that portions of said means may be used without others and come within the scope of the invention.

Having thus described my invention I claim:

1. In apparatus for paraffining receptacles, a paraffine bath, means to fuse and maintain the paraffine in a predetermined fused condition, a travelling conveyor, receptacle holding means adapted to support the receptacle exterior of the bottom thereof carried by the conveyor to have adjustment on a horizontal axis and effect adjustment of the receptacle in the plane of its axis, means to guide the upper stretch of the conveyor in its travel relative to the paraffine bath to immerse the receptacle in and move it through and out of the bath, cam tracks arranged successively at opposite sides of the travel of the conveyor, means carried by the receptacle supporting means at opposite sides of the conveyor to engage and follow the cam tracks relative to one side of the conveyor alternately with the engaging and following of the cam tracks relative to the other side of the conveyor by the travel of the conveyor to adjust the receptacle holder to position to permit engaging thereon of a receptacle in upright position, then prior to immersing of the receptacle in the paraffine bath adjust the holder to position the receptacle with the mouth end tilted upward slightly from the horizontal with the bottom foremost and in said position immerse the receptacle in the paraffine bath with the receptacle mouth open to the atmosphere as it is entered into the paraffine bath to effect a gradual filling of the paraffine into the receptacle and expelling of the air from the receptacle by the entrance of the paraffine into the receptacle and prevent the pocketing of air in the receptacle by the immersing of the receptacle in the paraffine bath.

2. Apparatus for paraffining receptacles as claimed in claim 1, wherein the cam tracks are arranged to maintain the receptacle in horizontal position with the mouth end tilted upward slightly from the horizontal as it is moved through and out of the paraffine bath to effect the flow of paraffine from and longitudinally toward the bottom of the receptacles, and as the receptacle is moved out of the bath adjust the holder to invert the receptacle and engage the mouth end in the paraffine bath and pocket air in the receptacle and maintain the receptacle in said position as the mouth end is withdrawn from the paraffine bath.

3. Apparatus for paraffining receptacles as claimed in claim 1, wherein the cam following means associated with the receptacle holding means after the receptacle is immersed in the paraffine bath engages with successive cam tracks during the travel of the conveyor, and said cam tracks being arranged to maintain the receptacle in said position with the mouth tilted upward to the horizontal as the receptacle is moved through and out of the paraffine bath, and permit the major portion of the paraffine to drain from the receptacle as it is moved out of the paraffine bath and effect a flow of the paraffine to and along a seam at the side of the receptacle, then adjust the receptacle by a quick movement to inverted position slightly inclined to the vertical with the mouth lowermost and engaging in the paraffine bath and maintained in said position as it is withdrawn from the paraffine bath to drain the paraffine therefrom, the cam following means then engaging with the successive cam tracks arranged to effect to and fro movement of the receptacle in the plane of the longitudinal axes thereof from said inverted position to upright vertical position to effect a flow of the paraffine transversely and longitudinally into and out of the receptacle thereby to spread the paraffine in an even film over the receptacle surface and build up a paraffine fillet at the side seam of the receptacle, and finally to upright position to effect a flow to and building up of a paraffine fillet at the bottom seam.

4. In apparatus for paraffining paper receptacles having side and bottom seams, a supporting structure including spaced parallel side members, a paraffine bath positioned between the side members adjacent one end of the frame, means to fuse and maintain the paraffine at a predetermined temperature, an endless travelling conveyor embodying a pair of chains with one chain arranged at each side of and exterior of the bath, bars extended transversely between and rotatably carried by said chains, receptacle holders mounted on and spaced along said bars to releasably support receptacles, rails fixed to the side members of the frame for engagement of rollers carried by the bars to support and guide the travel of the conveyor chains, wheels over which the conveyor chains are guided to immerse receptacles carried by the bars in and move them through and out of the bath, crank arms fixed to the ends of each bar and each of said arms carrying a roller, and a series of cam tracks positioned successively on each of the side members of the frame relative to the travel of the conveyor chains, one series of cam tracks adapted for the engagement and travel relative thereto of the roller on one crank arm alternately with the engagement of the roller on the other crank arm and travel thereof relative to the other series of cam tracks and said cam tracks arranged to effect rotative adjustment of the receptacle holder carrying bars in successive sequence to first position the holders to permit engaging receptacles in an upright position thereon with the side seam facing opposite to the direction of travel of the conveyor, then adjust the bars to position the receptacles with the mouth end inclined slightly upward from the horizontal with the side seam lowermost and the bottom foremost relative to the direction of travel of the conveyor and maintain the receptacles in said position as they are immersed in the paraffine bath to expel air from the receptacles by the flow of the paraffine therein and in said position moved through and out of the bath, then adjust the bars to invert the receptacles to position inclined slightly to the vertical with the side seam lowermost and engage the mouth end of the receptacle in the paraffine bath and in said position withdraw the receptacle from the paraffine bath to cause air to enter into the receptacle and a flow of the paraffine to the side seam as the surplus paraffine is drained from the receptacles, then to horizontal position with the side seam lowermost to cause the paraffine to flow over the side of the receptacle to and build up a paraffine fillet at the side seam, then to upright position inclined slightly to the vertical to cause a flow of the paraffine in a reverse direction over the side and bottom of the receptacle, and finally to upright position to cause a flow of the paraffine to and build up a paraffine fillet at the bottom seam of the receptacle.

5. In receptacle paraffining apparatus, a paraffine bath, means to fuse and maintain the paraffine in predetermined fused condition in the bath, and a pair of endless spaced conveyor chains, bars rotatably carried by and extending between the chains, receptacle holders on the bars, each holder embodying a receptacle supporting member fixed to a bar adapted to engage the bottom of a receptacle and a gripping member movably carried by the fixed member to have movement transversely of and yieldingly urged toward the fixed member, and said members arranged to grip the receptacle at the margin of the bottom portion of the receptacle, means to guide the conveyor chains relative to the bath to immerse the receptacles in the bath, and means to rotatably adjust the holder carrying bars to position the receptacles with the mouth open to the atmosphere as they are immersed in the paraffine bath and to inverted position as they are moved out of the bath to drain the paraffine from the receptacles.

6. In receptacle paraffining apparatus, a paraffine bath, means to fuse and maintain the paraffine in predetermined fused condition, a pair of endless spaced conveyor chains, bars rotatably carried by and extending between the chains, receptacle holders on the bars, each holder embodying a receptacle supporting member fixed to a bar to engage the bottom of the receptacle and a gripping member movably carried by the fixed member to have movement transversely of and yieldingly urged toward the fixed member, and said members arranged to grip the receptacle at the margin of the bottom portion of the receptacle, means arranged at one end of the conveyor chains operative during a predetermined length of travel of the conveyor chains to actuate the gripping member of the holders to permit engagement of receptacles on the holders, means to guide the conveyor chains relative to the bath to immerse receptacles on the holders in the bath, means to rotatably adjust the holder carrying bars to position the receptacles with the mouth open to the atmosphere as they are immersed in the bath and to inverted position as they are moved out of the bath to drain the paraffine from the receptacles, and means operative after the immersing of the receptacles in the bath and draining the paraffine from the receptacles to actuate the gripping member of the holders to release the receptacles therefrom.

7. In apparatus for coating receptacles, a bath of the coating material, an endless travelling conveyor embodying a pair of chains at opposite sides of the bath, bars extended between and rotatably carried by said chains, receptacle holders mounted on and spaced along the bars, each holder comprising a plate fixed to and extending laterally from a bar for engagement with marginal portions of the bottom of the receptacles and having lugs extending from the face and laterally of the carrier bars to engage a receptacle laterally to the bottom marginal portion, an arm movably mounted on the plate having a lug extending laterally therefrom and parallel with the plate lug, and said arms urged in a direction toward and transversely of the plate and clamp the receptacle between the arm and the plate lugs.

8. In receptacle coating apparatus, as claimed in claim 7, means to actuate said holder arms at predetermined points in the travel of the conveyor chains to move said arms laterally of the holder plates to permit seating of receptacles on the holder plates and release the receptacles from the holders.

9. In receptacle coating apparatus, as claimed in claim 7, cams for engagement of pins extending from the holder arms during the travel of the conveyor chains to move and position said arms laterally of the holder plates to permit seating of receptacles on the plates, said cams being mounted on the supporting structure forward of the conveyor chains and spaced transversely to correspond with the spacing of the holders on the carrier bars.

10. In receptacle coating apparatus, as claimed in claim 7, cams for engagement of pins extended from the holder arms during the travel of the conveyor chains to move and position said arms laterally of the holder plates to permit seating of receptacles on the plates, said cams being mounted on the supporting structure forward of the conveyor chains and spaced transversely to correspond with the spacing of the holders on the carrier bars, and cams for engagement of pins extended from the holder arms to move said arms laterally of the holder plate to release receptacles therefrom, said cams being mounted on the supporting structure intermediate the ends of and spaced transversely between the lower stretch of the conveyor chains to correspond with the spacing of the holders on the carrier bars.

ELLIS L. JONES.